(12) United States Patent
Osborn

(10) Patent No.: US 11,707,071 B2
(45) Date of Patent: Jul. 25, 2023

(54) TACO SHELL MOLD

(71) Applicant: Joshua Thomas Osborn, Henderson, NV (US)

(72) Inventor: Joshua Thomas Osborn, Henderson, NV (US)

( * ) Notice: Subject to any disclaimer, the term of this patent is extended or adjusted under 35 U.S.C. 154(b) by 162 days.

(21) Appl. No.: 16/932,469

(22) Filed: Jul. 17, 2020

(65) Prior Publication Data
US 2021/0022350 A1    Jan. 28, 2021

Related U.S. Application Data

(60) Provisional application No. 62/890,444, filed on Aug. 22, 2019, provisional application No. 62/876,833, filed on Jul. 22, 2019.

(51) Int. Cl.
*A21D 13/42*    (2017.01)
*A21C 15/02*    (2006.01)

(52) U.S. Cl.
CPC ............ *A21C 15/025* (2013.01); *A21D 13/42* (2017.01)

(58) Field of Classification Search
CPC ............................... A21C 15/025; A21D 13/42
See application file for complete search history.

(56) References Cited

U.S. PATENT DOCUMENTS

| | | | | |
|---|---|---|---|---|
| 2,664,812 A | * | 1/1954 | Molina ............... | A47J 37/1295 D1/122 |
| 2,740,349 A | * | 4/1956 | De Gonia ........... | A47J 37/1295 D7/354 |
| 3,020,826 A | * | 2/1962 | Silva ................... | A47J 37/1295 294/7 |
| 3,817,163 A | * | 6/1974 | Kizziar ............... | A47J 43/18 99/426 |
| 5,901,993 A | * | 5/1999 | Lowery ............... | B25B 7/02 294/7 |

* cited by examiner

*Primary Examiner* — Jacob T Minskey
*Assistant Examiner* — Adrien J Bernard
(74) *Attorney, Agent, or Firm* — Plager Schack LLP; Mark H. Plager; Kara K. Verryt

(57) ABSTRACT

A taco shell mold for cooking tortillas may include a tortilla cage sized and shaped to accommodate a tortilla. The tortilla cage may include an outer frame with a substantially U-shaped cross section and an inner frame nested within the outer frame, the inner frame having a substantially U-shaped cross section, wherein the inner frame is spaced from the outer frame, defining a tortilla slot between the inner frame and the outer frame. A handle attachment may be attached to the cage. Some versions of the taco shell mold may include a plurality of taco cages nested within one another.

9 Claims, 4 Drawing Sheets

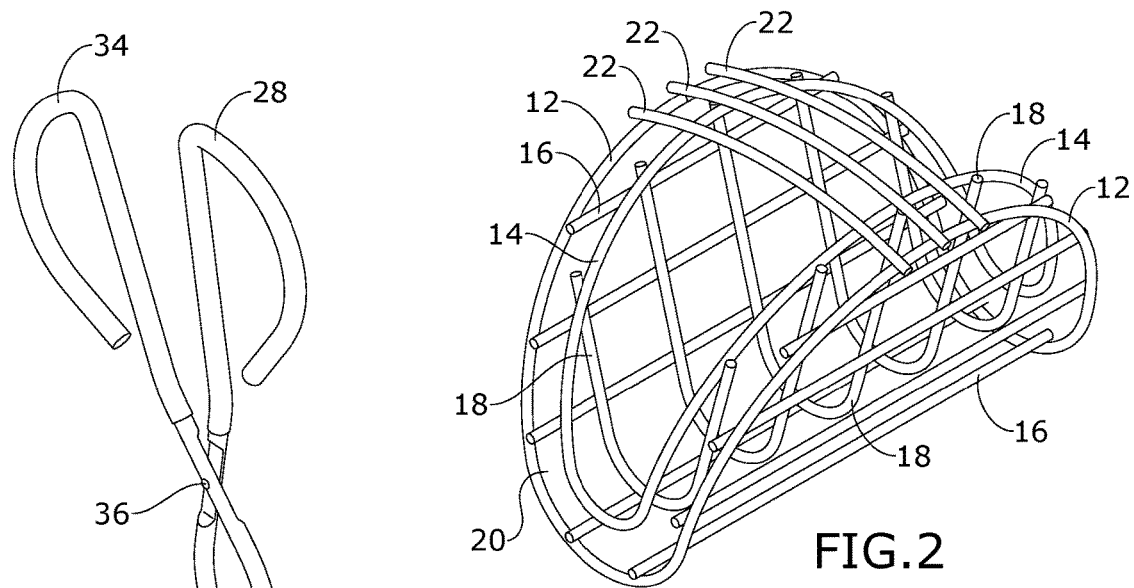
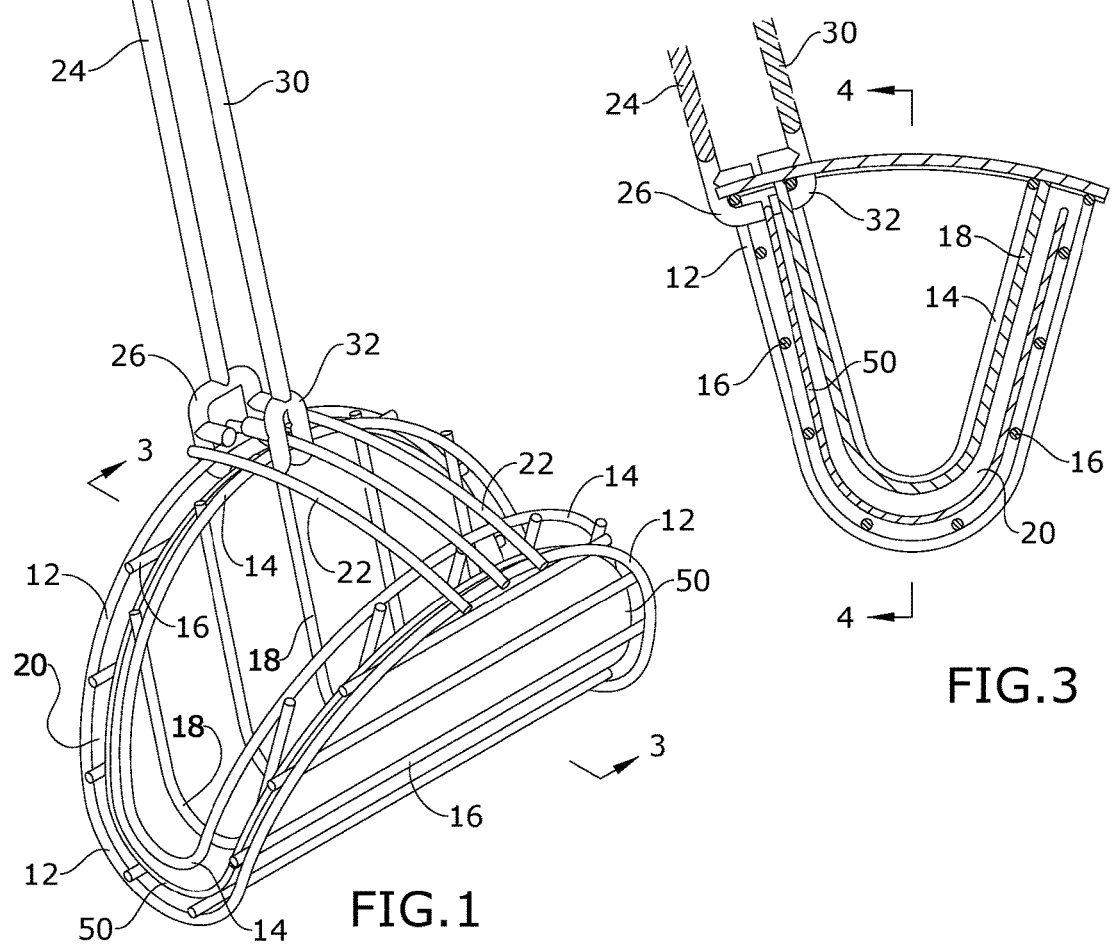

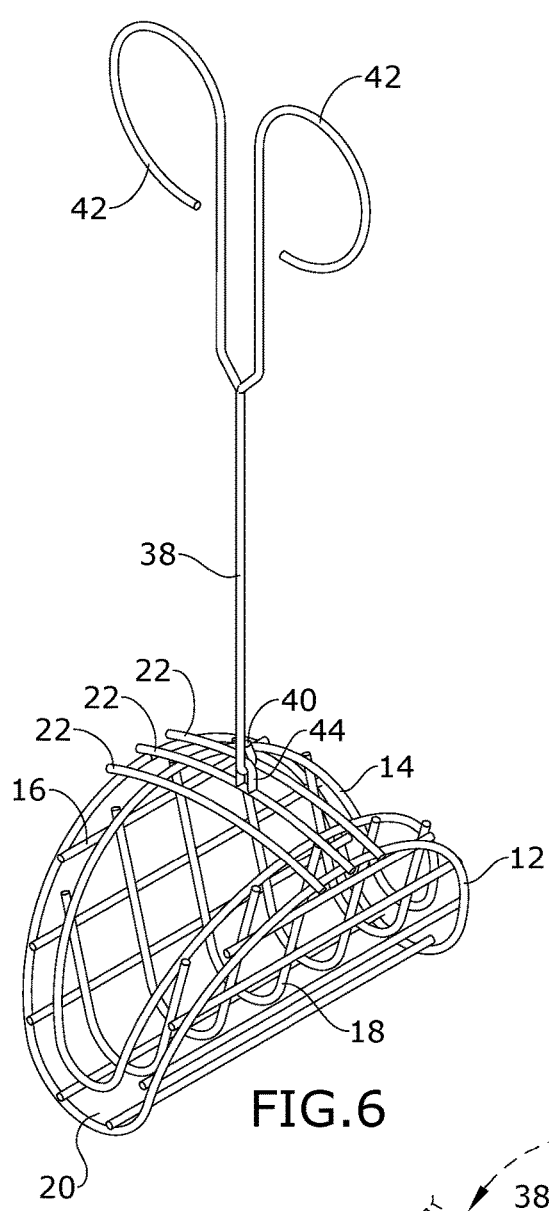
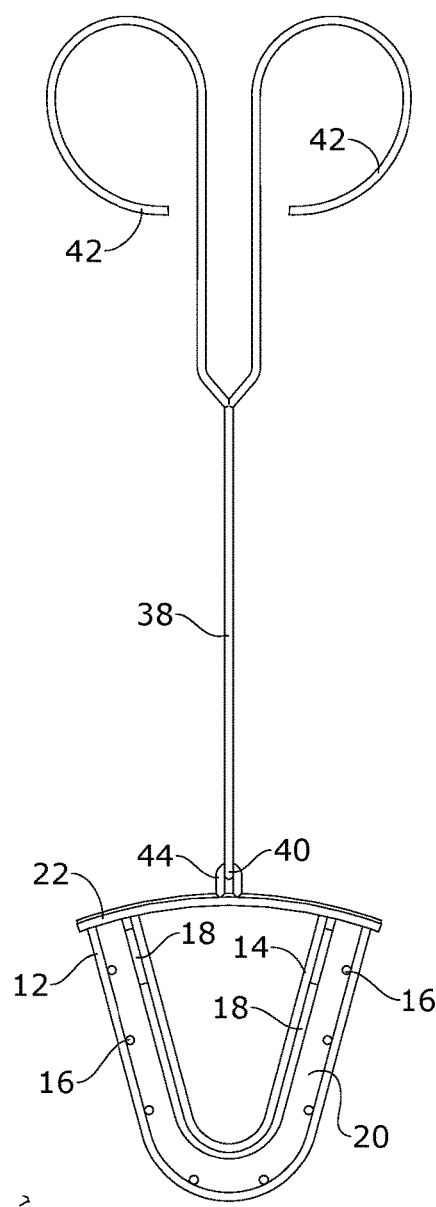
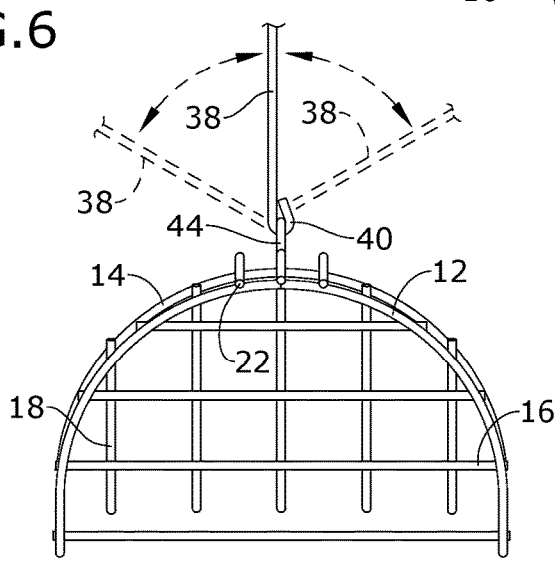
FIG.6
FIG.7
FIG.8

TACO SHELL MOLD

RELATED APPLICATION

This application claims priority to provisional patent applications U.S. Ser. No. 62/876,833 filed on Jul. 22, 2019 and U.S. Ser. No. 62/890,444 filed on Aug. 22, 2019, the entire contents of each of which is herein incorporated by reference.

BACKGROUND

The embodiments described herein relate generally to cooking devices and, more particularly, to a device for cooking a tortilla shell.

Existing taco shell molds do not offer a hands free solution to cook a single or multiple taco shells at the consumer level. Current shell molds require the user to constantly, without interruption, hold the tongs in place while the tortilla cooks. As a result, the devices cannot be used to cook shells in the oven or other mediums that do not use oil for frying. Moreover, the existing devices require a large amount of oil to cook.

Therefore, what is needed is a device for cooking a tortilla shell and molding it into shape, wherein the device requires limited or no oil and provides for cooking in different mediums and cooking of multiple shells simultaneously.

SUMMARY

Some embodiments of the present disclosure include a taco shell mold for cooking tortillas and may include a tortilla cage sized and shaped to accommodate a tortilla. The tortilla cage may include an outer frame with a substantially U-shaped cross section and an inner frame nested within the outer frame, the inner frame having a substantially U-shaped cross section, wherein the inner frame is spaced from the outer frame, defining a tortilla slot between the inner frame and the outer frame. A handle attachment may be attached to the cage. Some versions of the taco shell mold may include a plurality of taco cages nested within one another for cooking of multiple tortillas at once.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of one embodiment of the present disclosure.

FIG. 2 is a perspective view of one embodiment of the present disclosure.

FIG. 3 is a section view of one embodiment of the present disclosure, taken along line 3-3 in FIG. 1.

FIG. 6 is a perspective view of one embodiment of the present disclosure.

FIG. 7 is a front view of one embodiment of the present disclosure.

FIG. 8 is a side view of one embodiment of the present disclosure.

DETAILED DESCRIPTION

Figure 4:
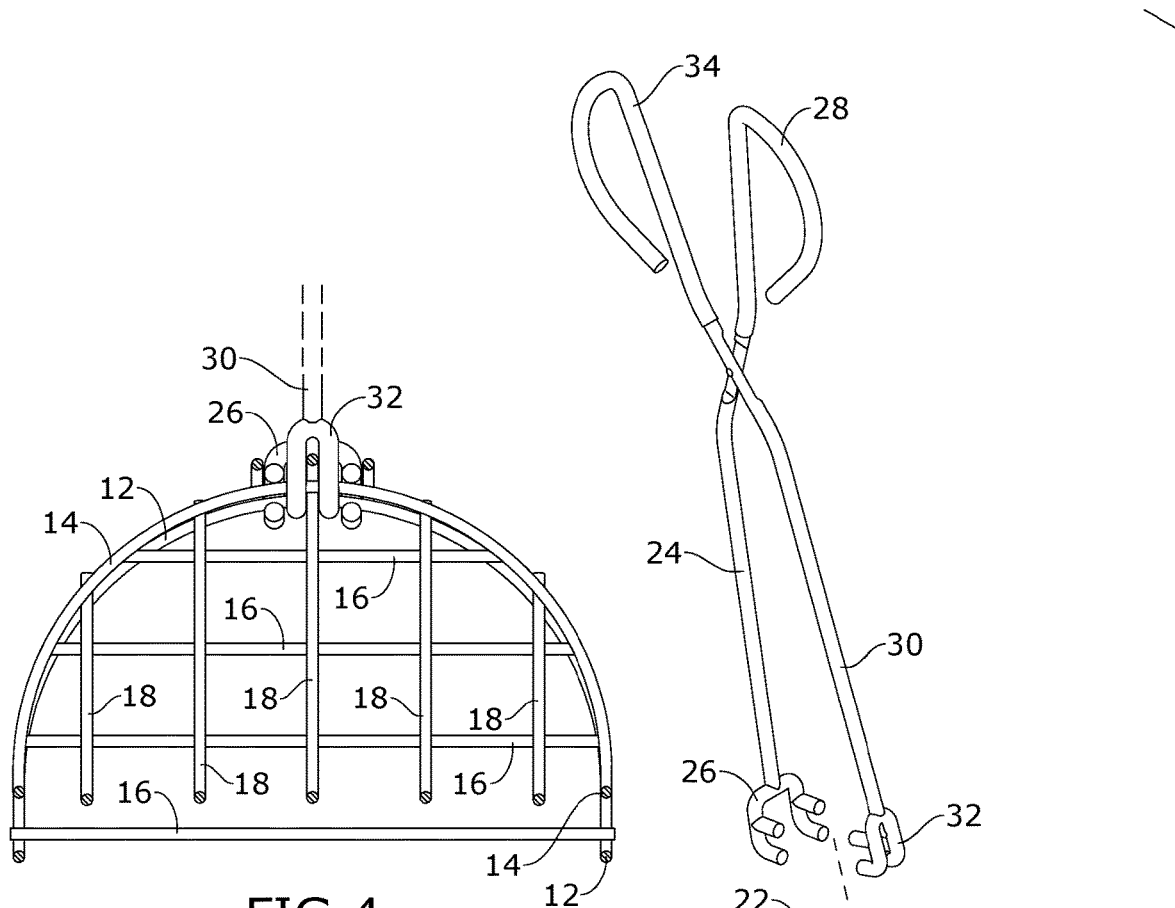
FIG. 4 is a section view of one embodiment of the present disclosure, taken along line 4-4 in FIG. 3.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a taco shell mold and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements and the following examples are presented as illustrative examples only.

By way of example, and referring to FIGS. 1-10, some embodiments of the invention include a taco shell mold for cooking tortillas 50, the taco shell mold comprising a tortilla cage sized and shaped to accommodate a tortilla 50 and a handle attachment attached to the tortilla cage, wherein the handle attachment may be used to remove the tortilla cage from the cooking medium.

As shown in the Figures, the tortilla cage may comprise an outer frame 12 with a substantially U-shaped cross section and an inner frame 14 nested within the outer frame 12, the inner frame 14 also having a substantially U-shaped cross section, wherein the inner frame 14 is spaced from the outer frame 12, defining a tortilla slot 20 between the inner frame 14 and the outer frame 12. A top surface of the tortilla cage may comprise at least one top spreader bar 22 extending from a first top edge of the outer frame 12, across the top edges of the inner frame, and to a second top edge of the outer frame 12. Each of the frames may also comprise supports, such that the tortilla 50 is held securely within the tortilla slot 20. For example, the outer frame 12 may comprise a plurality of spaced longitudinal supports 16 extending the length thereof, and the inner frame 14 may comprise a plurality of spaced latitudinal supports 18, wherein the longitudinal supports 16 may be substantially perpendicular to the latitudinal supports 18. As shown, for example, in FIG. 4, the arrangement of the supports 16, 18 may form a grid-like pattern.

Figure 9:
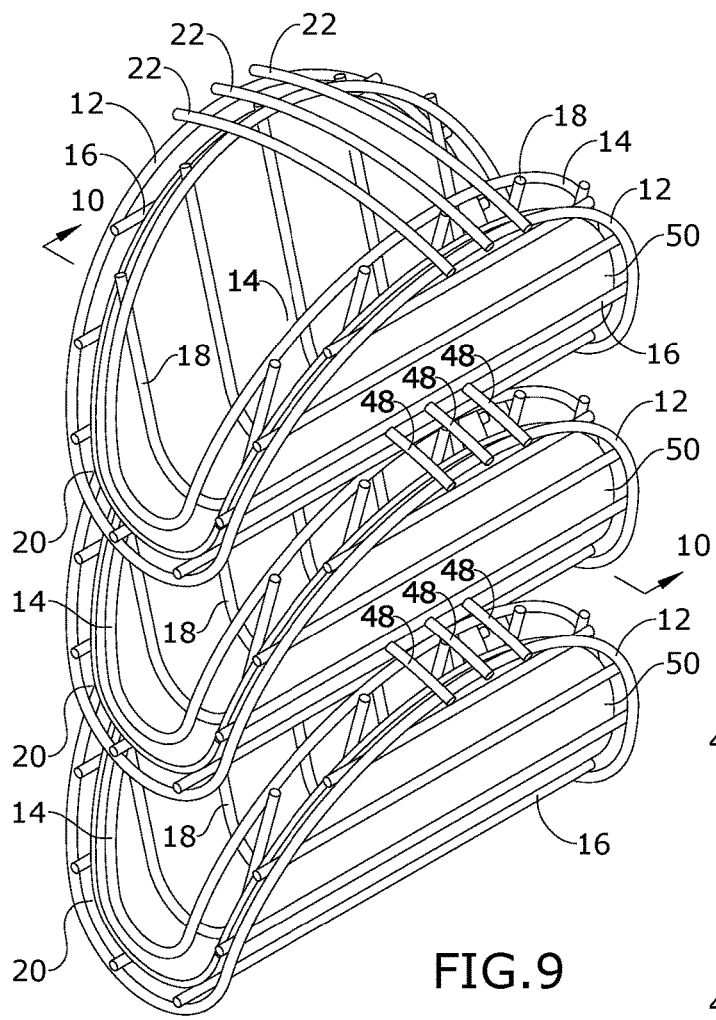
FIG. 9 is a perspective view of one embodiment of the present disclosure.
Figure 10:
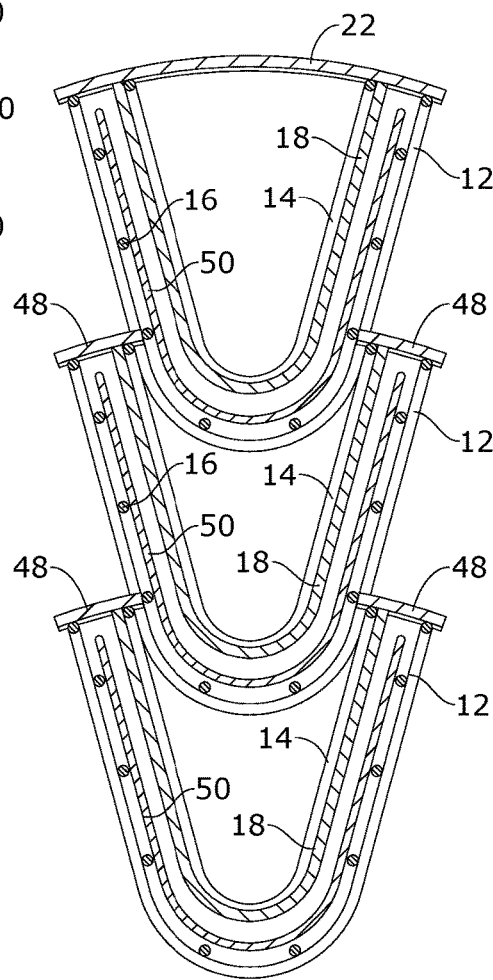
FIG. 10 is a section view of one embodiment of the present disclosure, taken along line 10-10 in FIG. 9.

Embodiments of the taco shell mold may be designed to cook a single tortilla 50, as shown in FIGS. 1-8. Alternatively, and as shown in FIGS. 9 and 10, other embodiments of the taco shell mold may be designed to cook multiple tortillas 50 simultaneously. For example, the device may be designed to cook 3 tortillas 50 simultaneously. In embodiments designed to cook multiple tortillas 50 simultaneously, the device may comprise a plurality of stacked cages, wherein the top cage includes a top spreader bar 22, as described above, and the lower cages include at least two short top spreader bars 48 extending from a top outer edge of the outer frame 12 to a longitudinal support 16 on the adjacent cage. As shown in FIGS. 9 and 10, the top cage is nested into a second cage and so on, until the desired number of cages have been connected.

As described above, the taco shell mold of the present disclosure includes a handle attachment attached to the tortilla cage. In some embodiments, such as those shown in FIGS. 1 and 3-5, the handle attachment may comprise a removable handle attachment, whereas in other embodiments, such as those shown in FIGS. 6-8, the handle attachment may comprise a fixedly attached handle. In yet, further embodiments, any existing or suitable device may be used as the handle attachment to move the taco shell mold, particularly into and out of a cooking medium.

Figure 5:
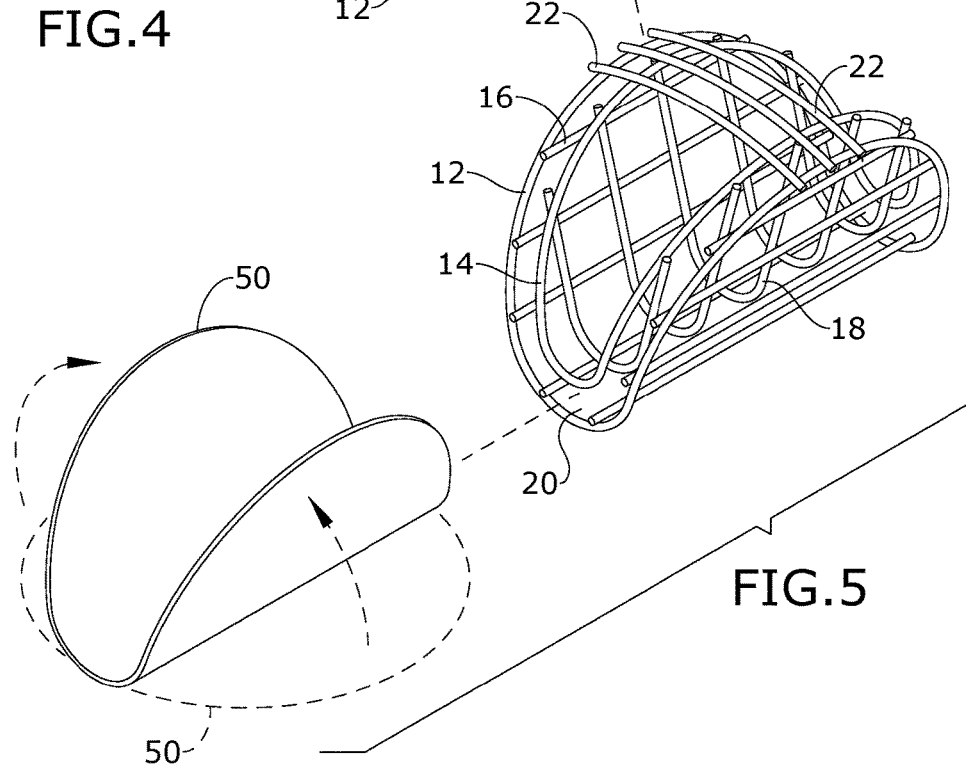
FIG. 5 is an exploded view of one embodiment of the present disclosure.

As shown in the figures, the removable handle attachment may comprise a pair of tongs comprising a first tong arm 24 pivotally attached to a second tong arm 30 by, for example, a tong pivot 36, a first tong handle 28 attached to a distal end of the first tong arm 24, a second tong handle 34 attached to a distal end of the second tong arm 30, a first tong fork 26 attached to a proximal end of the first tong arm 24, and a second tong fork 32 attached to a proximal end of the second tong arm 30, wherein the first tong fork 26 and the second tong fork 32 are designed to come together and hug a portion of the cage, as shown in FIG. 3. As shown in FIG. 5, the first tong fork 26 may comprise a plurality of, such as four, fork prongs substantially perpendicular to the plane of the first tong arm 24 and extending toward the second tong fork 32 when the hand attachment is in an open configuration. The second tong fork 32 may comprise a plurality, such as three, fork prongs substantially perpendicular to the plane of the second tong arm 30 and extending toward the first tong fork 26, wherein the prongs extend such that when the first tong fork 26 and the second tong fork 32 come together, the prongs nestle together as shown, for example, in FIG. 4. Use of the removable handle attachment may allow a user to place the cage into or onto the cooking medium and detach the handle attachment until it is time to remove the taco cage from the cooking medium.

As shown in FIGS. 6-8, the fixedly attached handle may comprise a fixed handle arm 38 attached, such as pivotally attached, to the taco cage. For example, the fixed handle arm 38 may comprise a proximal end with a fixed handle bottom loop 40 attached to a spreader bar loop 44 extending from a spreader bar 22 on the taco cage. Because the structure may be a loop engaging with (or wrapped around) a second loop, the fixedly attached handle may be able to move such that it can extend from the cage at any variety of angles. As also shown in the Figures, a distal end of the fixed handle arm 38 may comprise a grasping surface, such as a pair of fixed handle finger loops 42.

The device of the present disclosure may be made of any suitable or desired materials and, in some embodiments comprises stainless steel or other materials acceptable for cooking. The fixed handle finger loops 42 and the tong handles, 28, 34 may each optionally include a protective sleeve positioned thereon. The dimensions of the device of the present disclosure are not particularly limited, as individuals may wish to cook varying sized tortillas. Moreover, the U-shape of the cage may range from a narrower to a wider angled U-shape. In some embodiments, the bottom of the U-shape may be rounded, while in other embodiments, the bottom of the U-shape may be squared off.

To use the device of the present disclosure, a tortilla 50 or other food item (such as vegetables or the like) may be placed into the cage via the tortilla slot 20. The whole device may then be placed into or onto the desired cooking medium. Once the food item is cooked, as desired, the cage may be removed from the cooking medium and the food items may be slid out of the cage.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A taco shell mold for cooking tortillas, the taco shell mold comprising:
   a tortilla cage sized and shaped to accommodate a tortilla, the tortilla cage comprising:
      an outer frame with a substantially U-shaped cross section;
      an inner frame nested within the outer frame, the inner frame having a substantially U-shaped cross section, wherein the inner frame is spaced from the outer frame, defining a tortilla slot between the inner frame and the outer frame; and
      at least one top spreader bar extending from a first top edge of the outer frame, across top edges of the inner frame, and to a second top edge of the outer frame, wherein the at least one top spreader bar comprises a continuous curve that abuts the first top edge of the outer frame, the top edges of the inner frame, and the second top edge of the outer frame; and
   a handle attachment attached to the tortilla cage.

2. The taco shell mold of claim 1, further comprising supports extending along the outer frame and the inner frame.

3. The taco shell mold of claim 2, wherein the outer frame comprises a plurality of spaced longitudinal supports.

4. The taco shell mold of claim 2, wherein the inner frame comprises a plurality of spaced latitudinal supports.

5. The taco shell mold of claim 1, wherein:
   the outer frame comprises a plurality of spaced longitudinal supports;
   the inner frame comprises a plurality of spaced latitudinal supports; and
   the longitudinal supports and the latitudinal supports are positioned and arrange to form a grid-like pattern.

6. The taco shell mold of claim 1, further comprising a second tortilla cage nested within the tortilla cage.

7. The taco shell mold of claim 1, wherein the handle attachment is removably attached to the cage and comprises:
   a pair of tongs comprising:
      a first tong arm pivotally attached to a second tong arm;
      a first tong handle attached to a distal end of the first tong arm;
      a second tong handle attached to a distal end of the second tong arm;
      a first tong fork attached to a proximal end of the first tong arm; and
      a second tong fork attached to a proximal end of the second tong arm,
   wherein the first tong form comprises first tong prongs that extend toward second tong prongs on the second tong fork.

8. The taco shell mold of claim 1, wherein the handle attachment is fixedly attached to the cage and comprises:
   a fixed handle arm pivotally attached to the taco cage, the fixed handle arm comprising:

a proximal end with a fixed handle bottom loop attached to a spreader bar loop extending from a spreader bar on the taco cage; and a distal end with a grasping surface.

9. The taco shell mold of claim 8, wherein the grasping surface is a pair of finger loops.

\* \* \* \* \*